United States Patent
Yokomakura et al.

(10) Patent No.: US 9,407,411 B2
(45) Date of Patent: Aug. 2, 2016

(54) CONTROL STATION APPARATUS, WIRELESS COMMUNICATION SYSTEM, ALLOCATION METHOD AND PROGRAM

(71) Applicant: SHARP KABUSHIKI KAISHA, Osaka-shi, Osaka (JP)

(72) Inventors: Kazunari Yokomakura, Osaka (JP); Hiroki Takahashi, Osaka (JP); Jungo Goto, Osaka (JP); Osamu Nakamura, Osaka (JP); Yasuhiro Hamaguchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 69 days.

(21) Appl. No.: 14/385,005

(22) PCT Filed: Mar. 4, 2013

(86) PCT No.: PCT/JP2013/055786
§ 371 (c)(1),
(2) Date: Sep. 12, 2014

(87) PCT Pub. No.: WO2013/137034
PCT Pub. Date: Sep. 19, 2013

(65) Prior Publication Data
US 2015/0063238 A1    Mar. 5, 2015

(30) Foreign Application Priority Data

Mar. 14, 2012    (JP) .................................. 2012-057929

(51) Int. Cl.
*H04L 5/00* (2006.01)
*H04L 27/26* (2006.01)
(52) U.S. Cl.
CPC ............ *H04L 5/0048* (2013.01); *H04L 5/0016* (2013.01); *H04L 5/0035* (2013.01); *H04L 5/0051* (2013.01); *H04L 5/0053* (2013.01); *H04L 5/0091* (2013.01); *H04L 27/261* (2013.01)

(58) Field of Classification Search
CPC ... H04L 5/0048; H04L 5/0051; H04L 5/0091; H04L 5/0053; H04L 5/0016; H04L 5/0035; H04L 27/261
See application file for complete search history.

(56) References Cited

U.S. PATENT DOCUMENTS 8,917,618 B2 * 12/2014 Chatterjee ................ H04B 1/69
370/252
2012/0314743 A1 * 12/2012 Yoon .................... H04L 27/2613
375/219

(Continued)

OTHER PUBLICATIONS

3GPP TSG RAN WG1 Meeting #68, R1-120882, Ericsson, ST-Ericsson, Agenda Item: 7.5.6.1.1, "Details on UL DMRS", Feb. 10-10, 2012.

*Primary Examiner* — Afsar M Qureshi
(74) *Attorney, Agent, or Firm* — Birch, Stewart, Kolasch & Birch, LLP

(57) ABSTRACT

Means of configuring a reference signal unique to a mobile station apparatus is provided. There is provided a control station apparatus notifying a first mobile station apparatus of a parameter group generating a reference signal. The control station apparatus includes: an RRC layer to configure a parameter set including a plurality of parameter groups generating the reference signal; and a physical layer to select one of the parameter groups and notify the mobile station apparatus. It is preferred that the parameter set is configured with a plurality of parameter groups that respectively configure a sequence number and a cyclic shift hopping pattern of the reference signal and includes a parameter group generating a reference signal the same as in a second mobile station apparatus different from the first mobile station apparatus.

8 Claims, 3 Drawing Sheets

(56) References Cited

U.S. PATENT DOCUMENTS

| | | | | |
|---|---|---|---|---|
| 2013/0148592 A1* | 6/2013 | Noh | ............... | H04W 72/12 370/329 |
| 2014/0161093 A1* | 6/2014 | Hoshino | ............ | H04B 7/024 370/329 |
| 2014/0247799 A1* | 9/2014 | Suzuki | ............ | H04W 74/0833 370/329 |
| 2014/0301345 A1* | 10/2014 | Kim | ............... | H04J 11/00 370/329 |
| 2015/0043465 A1* | 2/2015 | Ouchi | ............ | H04W 16/28 370/329 |
| 2015/0146512 A1* | 5/2015 | Yoon | ............ | H04L 5/0023 370/208 |

* cited by examiner though, but also by cooperation. Such technique is called as coordinated multi-point transmission and reception (COMP) and is under a variety of review.
CONTROL STATION APPARATUS, WIRELESS COMMUNICATION SYSTEM, ALLOCATION METHOD AND PROGRAM

TECHNICAL FIELD

The present invention relates to a control station apparatus, a wireless communication system, an allocation method, and a program.

BACKGROUND ART

In the Third Generation Partnership Project (3GPP), which is one of the standards bodies, standardization of 3GPP Long Term Evolution (LTE) Rel-10 (later systems may also be referred to as LTE Advanced (LTE-A)), which is one of the fourth generation mobile communication systems, is almost completed, and currently, standardization of LTE Rel-11 that is an extension thereof is being performed.

In an up link (communication from a mobile station apparatus (user equipment: UE) to a base station apparatus) of LTE Rel-11, a heterogeneous network to install a macro base station (enhanced node B: eNB) that covers a relatively wide range, an LPN (low power node, radio remote head: RRH) that covers a narrow range in an area covered by a macro base station (may be referred to as a macro area), and the like is currently under review.

In a heterogeneous network, it is possible to reduce influence of the interference between a macro base station and an LPN or between an LPN and an LPN, not only by cell splitting gain obtained by carrying out control respectively as separate base stations, but also by cooperation. Such technique is called as coordinated multi-point transmission and reception (COMP) and is under a variety of review.

Further, supporting different coverage with up and down links is also under review, and in order to achieve these issues at the same time, use of a reference signal parameter unique to a mobile station apparatus is under review (NPL 1).

CITATION LIST

Non Patent Literature

NPL 1: 3GPP R1-120882

SUMMARY OF INVENTION

Technical Problem

However, in NPL 1, although independent configuration of a sequence of a reference signal unique to a mobile station apparatus is mentioned, there is no description on a specific method and there is a problem that a method of actually configuring only with NPL 1 is difficult.

The present invention has made in view of such situation, and it is an object thereof to provide means of configuring a reference signal unique to a mobile station apparatus.

Solution to Problem

According to one aspect of the present invention, there is provided a control station apparatus notifying a first mobile station apparatus of a parameter group generating a reference signal, the control station apparatus including: an RRC layer to configure a parameter set including a plurality of parameter groups generating the reference signal; and a physical layer to select one of the parameter groups to notify the mobile station apparatus.

It is preferred that the parameter set is configured with a plurality of parameter groups that respectively configure a sequence number and a cyclic shift hopping pattern of the reference signal and includes a parameter group generating a reference signal the same as in a second mobile station apparatus different from the first mobile station apparatus.

It is preferred that the parameter set includes an initial value to configure a cyclic shift hopping pattern the same as in the second mobile station apparatus and, in a case that communication occurs at the same time of a legacy (conventional) mobile station apparatus, notifies the first mobile station apparatus of that.

It is preferred that the parameter set includes a parameter generating identical reference signal and cyclic shift hopping pattern in a plurality of cooperating sending and receiving points.

It is preferred that the parameter set is configured only with a parameter group that determines a plurality of a sequence number and a cyclic shift hopping pattern is determined with a virtual cell ID to determine a sequence number of the reference signal.

It is preferred that the parameter set includes parameter groups to configure a sequence number of a reference signal the same as in the second mobile station apparatus.

In addition, the present invention is a wireless communication system, including a control station apparatus notifying a first mobile station apparatus of a parameter group generating a reference signal and a mobile station apparatus, in which the control station apparatus includes an RRC layer to configure a parameter set having a plurality of parameter groups generating a reference signal, a physical layer to select one of the parameter groups and notify the first mobile station apparatus, the mobile station apparatus includes the first mobile station apparatus and a second mobile station apparatus different from the first mobile station apparatus, and the parameter set is configured with a plurality of parameter groups that respectively configure a sequence number and a cyclic shift hopping pattern of the reference signal and includes parameter groups generating a reference signal same as the second mobile station apparatus different from the first mobile station apparatus.

According to another aspect of the present invention, there is provided a control method in a control station apparatus that notifies a first mobile station apparatus of a parameter group generating a reference signal, including the steps of: configuring a parameter set including a plurality of parameter groups generating the reference signal in an RRC layer; and selecting one of the parameter groups in a physical layer to notify a mobile station apparatus.

The present invention may also be a program causing a computer to execute the control method described above, and may also be a computer-readable recording medium to record the program.

DESCRIPTION OF EMBODIMENTS

First Embodiment

Figure 1:
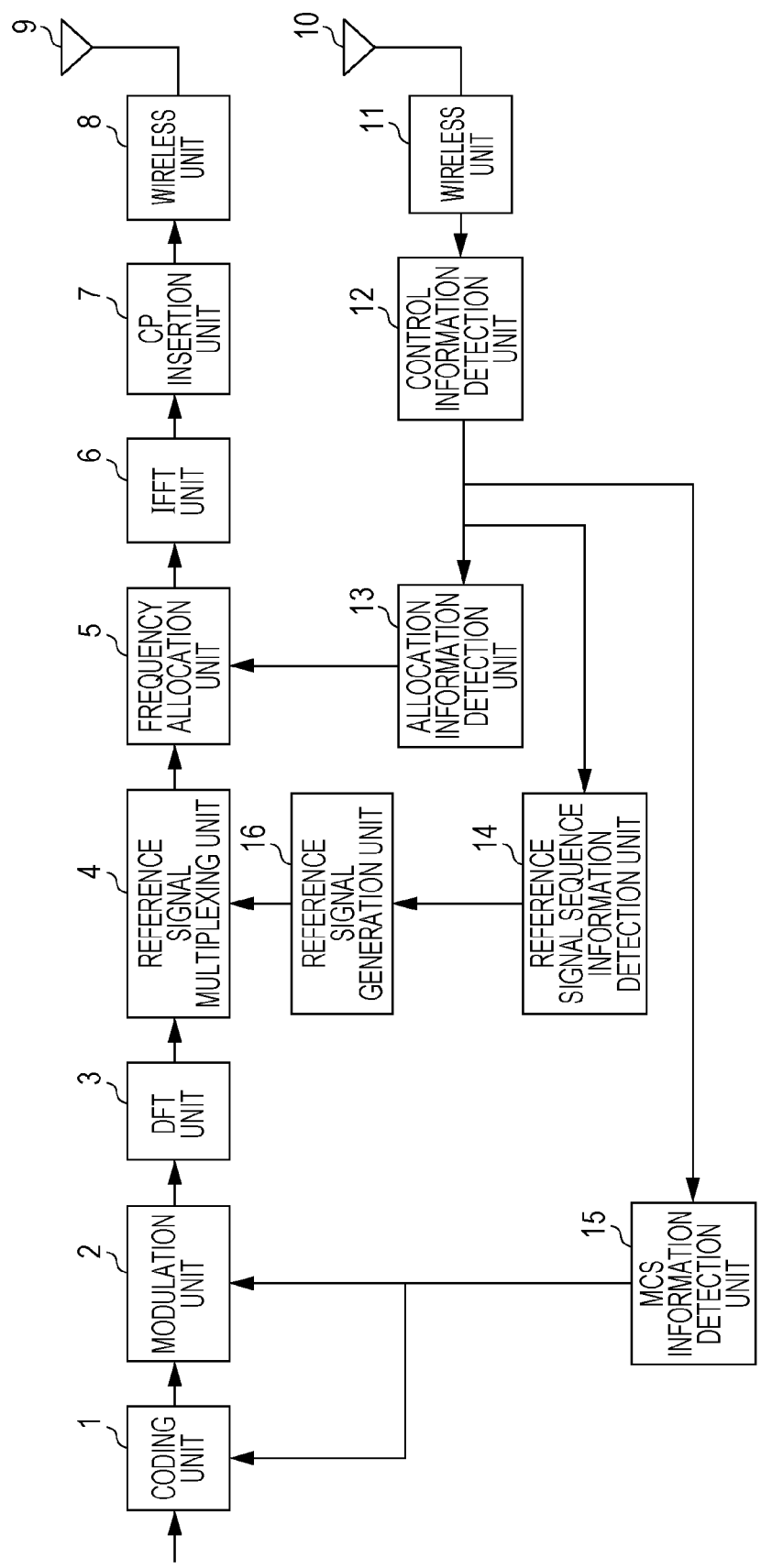
FIG. 1 is a functional block diagram illustrating one configuration example of a mobile station apparatus in a first embodiment of the present invention.

Descriptions are given below to a first embodiment of the present invention with reference to the drawings. FIG. 1 is a functional block diagram illustrating one configuration example of a mobile station apparatus in the present embodiment. In a mobile station apparatus A, control information received in an antenna 10 is subject to process of converting a wireless signal to a baseband signal, such as analog to digital (A/D) conversion and down conversion, by a wireless unit 11, and the control information is detected by a control information detection unit 12. The detected control information is inputted to an allocation information detection unit 13, and an allocation frequency location of the frequency resource is detected to be inputted to a frequency allocation unit 5. Next, information necessary for generation of a reference signal in a reference signal sequence information detection unit 14 is detected, and the information is inputted to a reference signal generation unit 16, and a reference signal is generated in the reference signal generation unit 16. In addition, in an MCS information detection unit 15, modulation and coding schemes (MCS) indicating information of a modulation scheme and a coding rate is detected to be inputted to a coding unit 1 and a modulation unit 2.

Error correction coding is carried out based on the notified coding rate in the coding unit 1, and modulation such as quaternary phase shift keying (QPSK) and 16 quadrature amplitude modulation (QAM) is carried out in the modulation unit 2, and time frequency transform is carried out by discrete Fourier transform (DFT) in a DFT unit 3. Next, in a reference signal multiplexing unit 4, a demodulation reference signal (DMRS) generated in the reference signal generation unit 16 is multiplexed to be inputted to the frequency allocation unit 5. A transmit signal is allocated in a frequency domain based on the allocation information in the frequency allocation unit 5 to be transformed to a time signal using inverse fast Fourier transform (IFFT) in an IFFT unit 6, and insertion of a cyclic prefix (CP), which is process of copying the back of a time waveform to the front, is carried out in a CP insertion unit 7, and process to make a wireless signal, such as D/A conversion and up conversion, is carried out by a wireless unit 8 to be sent from an antenna 9.

Figure 2:
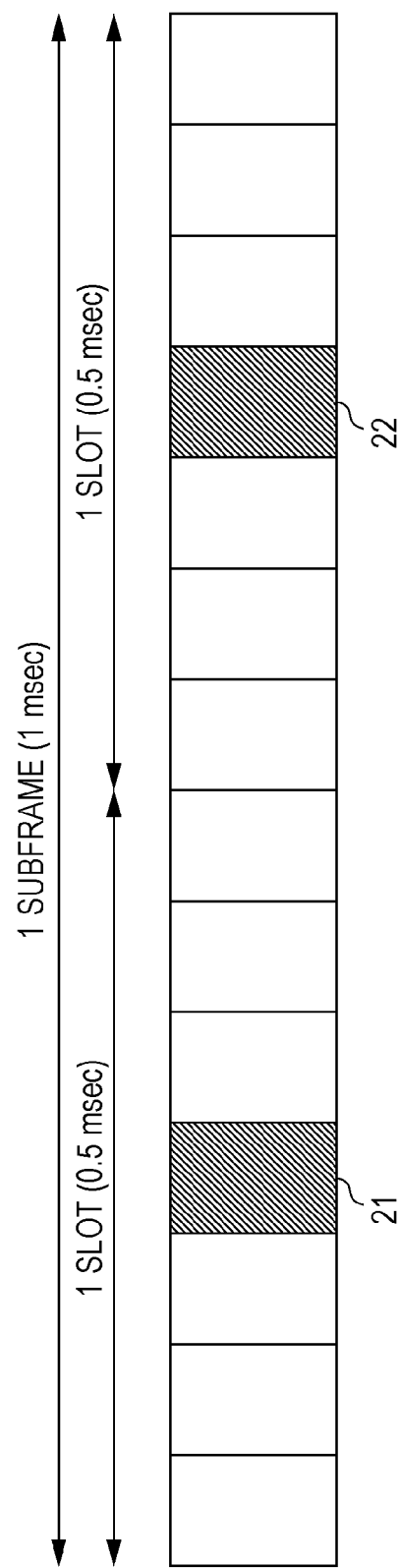
FIG. 2 is a diagram illustrating a subframe, which is a smallest unit of a resource of a mobile station apparatus.

Next, descriptions are given to the reference signal sequence information detection unit 14 and the reference signal generation unit 16 that represents characteristics of the present invention. In the present embodiment, descriptions are given to an example of a physical uplink shared channel (PUSCH), which is a data channel in a 3GPP LTE Rel-11 system. FIG. 2 illustrates a subframe, which is a smallest unit of a resource of a mobile station apparatus. A subframe composed of 1 msec is configured with 14 symbols of DFT blocks, and two slots are defined for respective 7 symbols. 21 and 22 to be time multiplexed in the center of the respective slots are DMRS, and two of them are defined in the subframe, that is, one in each slot.

In the Rel-11 system, the DMRS is generated from three parameters of a sequence group number, sequence group hopping, and a cyclic shift hopping pattern of the Zadoff-Chu sequence. It is possible to select the Zadoff-Chu sequence from 30 types of sequence having fixed amplitude and excellent in auto-correlation and cross-correlation, and each sequence number has different complex amplitude of a frequency domain. The sequence group hopping represents process to select a sequence different for each slot, and it is possible to determine which pattern to alter the Zadoff-Chu sequence. It is possible to select either to have the Zadoff-Chu sequence different for each slot or to have the same Zadoff-Chu sequence. The cyclic shift represents to further give phase rotation at a fixed interval for each subcarrier in a frequency domain to the Zadoff-Chu sequence in each slot, and one of eight types of a phase rotation amount is applicable. The cyclic shift hopping is to give different phase rotation amounts among the slots to the Zadoff-Chu sequence in the respective slots, and thus it is possible to achieve randomization of the interference between cells. A parameter to determine respective phase rotation amounts in the first slot and the second slot when the cyclic shift hopping is applied is defined as a cyclic shift hopping parameter.

In the reference signal sequence information detection unit 14, three parameters of $\{N_{ID}^{BSI}, \Delta_{SS}^{BSI}, c_{init}^{CSH}\}$ are detected from the inputted control information. Based on the parameters, in the reference signal generation unit 16, a reference signal is generated. Firstly, as Formula (1), a Zadoff-Chu sequence number u is configured.

[Math 1]

$$u = (f_{gh}(n_S) + f_{SS}) \bmod 30 \quad (1)$$

In Formula (1), $f_{gh}(n_S)$ is a formula defined in accordance with whether or not to perform sequence group hopping expressed in Formula (2), and is given as follows.

[Math 2]

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad (2)$$

It is to be noted that $n_S$ denotes a slot number (0 or 1), and for c(x), a random number generator based on an M sequence disclosed in the specification (TS36.211 v10.4.0, Section 7.2) is used, and $c_{init}$ that represents a connection of an initial value thereof is determined by the following formula.

[Math 3]

$$c_{init} = \left\lfloor \frac{N_{ID}^{BSI}}{30} \right\rfloor \quad (3)$$

It is found that Formula (3) uses $N_{ID}^{BSI}$ inputted from the reference signal sequence information detection unit 14. Next, descriptions are given below to $f_{SS}$ in Formula (1). $f_{SS}$ is defined as a different value depending on a control channel (PUCCH) as Formula (4) or a shared channel (PUSCH).

[Math 4]

$$f_{SS}^{PUCCH} = N_{ID}^{cell} \bmod 30 \quad (4)$$

[Math 5]

$$f_{SS}^{PUSCH} = (f_{SS}^{PUCCH} + \Delta_{SS}^{BSI}) \bmod 30 \quad (5)$$

Formula (4) expresses a parameter called $f_{SS}$ in a case of a control channel, and Formula (5) is $f_{SS}$ of a shared channel subject to the present embodiment. In such a manner, it is found that the Zadoff-Chu sequence number is determined using Formula (2) and Formula (5) and $N_{ID}^{BSI}$, $\Delta_{SS}^{BSI}$ are used to determine that.

Next, the cyclic shift hopping is described. The phase gradient that determines the phase rotation amount between adjacent subcarriers in an $n_S$th slot is expressed by Formula (6).

[Math 6]

$$n_{cs,\lambda} = (n_{DMRS}^{(1)} + n_{DMRS,\lambda}^{(2)} + n_{PN}(n_S)) \bmod 12 \qquad (6)$$

It is to be noted that $n_{DMRS}(1)$ is a value configured in a higher layer (disclosed in TS36.211 v10.4.0, Table 5.5.2.1.1-2), $n_{DMRS}(1)$ is a value notified by the control channel in a down link (disclosed in TS36.211 v10.4.0, Table 5.5.2.1.1-1), and $n_{PN}(n_S)$ is a parameter to change the cyclic shift amount among the slots defined in Formula (7).

[Math 7]

$$n_{PN}(n_S) = \sum_{i=0}^{7} c(8 N_{symb}^{UL} \cdot n_S + i) \cdot 2^i \qquad (7)$$

It is to be noted that $N_{symb}^{UL}$ is a number of DFT blocks (7 in the present embodiment) contained in one slot, and for c(x), a random number generator based on the M sequence disclosed in the specification (TS36.211 v10.4.0, Section 7.2) is used and an initial value thereof is $c_{init}^{CSH}$.

In such a manner, by independently configuring the parameters of $\{N_{ID}^{BSI}, \Delta_{SS}^{BSI}, c_{init}^{CSH}\}$ as values unique to the mobile station, it is possible to independently configure a sequence number and cyclic shift hopping. The parameters to determine the Zadoff-Chu sequence number are $N_{ID}^{BSI}$ and $\Delta_{SS}^{BSI}$, and the parameter to determine the cyclic shift hopping pattern is $c_{init}^{CSH}$.

Figure 3:
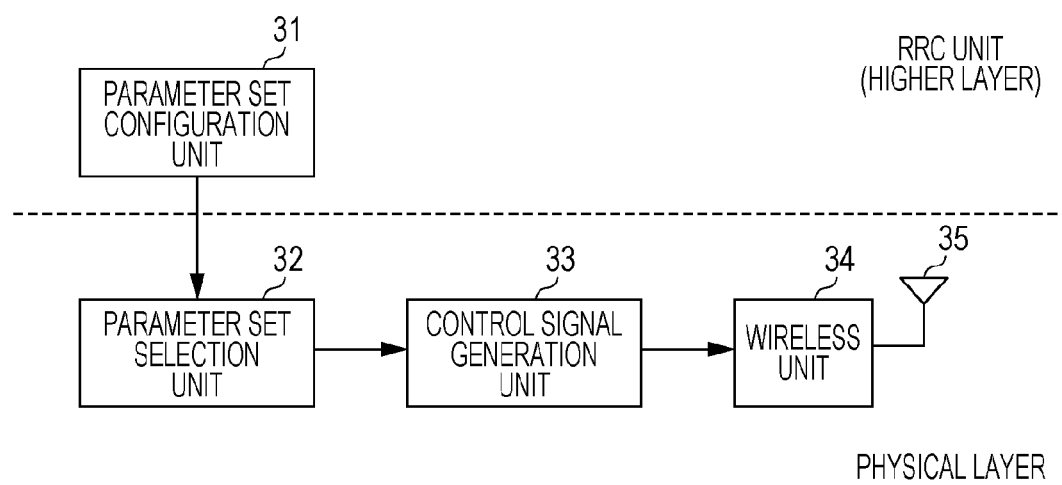
FIG. 3 is a functional block diagram illustrating a configuration example of a station apparatus.

Next, how to notify a mobile station apparatus of these three parameters is described. FIG. 3 illustrates a configuration example of a base station apparatus B. In this drawing, in a higher layer (a radio resource control (RRC) layer controlling a data link layer (layer 2) and belonging to a network layer (layer 3) unless otherwise specified is indicated herein, while the present invention described herein includes as long as a layer is higher than a physical layer (layer 1) (a layer achieving a protocol contained in the data link layer and the network layer)), a parameter set related to $\{N_{ID}^{BSI}, \Delta_{SS}^{BSI}, c_{init}^{CSH}\}$ (a plurality of sets of $\{N_{ID}^{BSI}, \Delta_{SS}^{BSI}, c_{init}^{CSH}\}$) is specified in a parameter set configuration unit 31 in advance and any one set is selected in a parameter set selection unit 32 in a lower physical layer. Here, the physical layer falls under the layer 1 of an open systems interconnection (OSI) basic reference model that carries out communication using a physical wireless channel and is a layer that carries out sending and receiving of a wireless signal. One of parameter sets selected in such a manner (herein, defined as a parameter group) is made as a down control signal, such as downlink control information (DCI), in a control information generation unit 33, and the control signal is converted to a wireless signal in a wireless unit 34 to be sent from an antenna 35 to a mobile station apparatus. Here, in a case of referring as a parameter herein, any one of parameter groups is defined.

TABLE 1

| Index | $N_{ID}^{BSI}$ | $\Delta_{SS}^{BSI}$ | $c_{init}^{CSH}$ |
|---|---|---|---|
| 0 | $N_1$ | $\Delta_1$ | $c_1$ |
| 1 | $N_2$ | $\Delta_2$ | $c_2$ |
| 2 | $N_3$ | $\Delta_3$ | $c_3$ |
| 3 | $N_{r10}$ | $\Delta_{r10}$ | $c_{r10}$ |

Next, a specific method of configuring a parameter set in the RRC is described. Table 1 indicates a specific example of parameter set in the RRC. In the table, four types of parameter set are prepared in advance in the RRC and it is possible to notify in two bits. Here, $\{N_{r10}, \Delta_{r10}, c_{r10}\}$ of Index 3 includes those having same configuration as a reference signal until the conventional Rel-10, and by configuring in such a manner, it is possible to orthogonalize the DMRS even when a mobile station apparatus of conventional Rel-10 is present in an area. Here, the mobile station apparatus of Rel-10 or earlier refers to a mobile station apparatus to which a reference signal automatically determined from each macro base station or a physical cell ID of the LPN is applied, that is, to which the parameter group is not notified and may be referred to as a legacy mobile station apparatus. Therefore, the sequence is basically different from a case of configuring a reference signal unique to a mobile station apparatus subject to the present invention. Although all parameters are configured to be same as a legacy mobile station apparatus here, it is possible to specifically orthogonalize with an orthogonal code called as an orthogonal cover code (OCC) even when a legacy mobile station apparatus is present as long as any one, particularly a parameter $c_{r10}$ having an identical cyclic shift pattern, is same. Although the example that the parameter set configured with the RRC is limited in advance from all considerable combinations is indicated here, when all combinations are intended to be available, $\{\Delta_{SS}^{BSI}, c_{init}^{CSH}\}$ relative to each value of $N_{ID}^{BSI}$ in the RRC may also be made as a parameter set separately.

For example, it may also be configured as that $\{\Delta_{SS}^{BSI}, c_{init}^{CSH}\}$ possible for $N_{ID}^{BSI}=0$ is made as one parameter set in the RRC, and similarly they are made as separate parameter sets taking as a reference, such as $N_{ID}^{BSI}=1, 2, 3, \ldots$, and any of parameter set is notified in the RRC, and one parameter group is selected from them.

TABLE 2

| Index | $N_{ID}^{BSI}$ | $\Delta_{SS}^{BSI}$ | $c_{init}^{CSH}$ |
|---|---|---|---|
| 0 | $N_c$ | $\Delta_c$ | $c_1$ |
| 1 | $N_2$ | $\Delta_2$ | $c_2$ |
| 2 | $N_3$ | $\Delta_3$ | $c_3$ |
| 3 | $N_{r10}$ | $\Delta_{r10}$ | $c_{r10}$ |

Table 2 indicates a parameter group in common with cooperation areas and control station apparatuses included in a parameter set. Here, $\{N_c, \Delta_c, c_c\}$ indicated in Index 0 are the example characterized by the present invention, and this configures a same parameter in a plurality of base stations in a case of cooperation communication. This is an example where same sequence number and cyclic shift hopping are applicable to all macro base stations and LPN (may also be referred to as a sending and receiving point, referred to as a control station apparatus herein) in the cooperation communication area. In such a manner, by configuring a parameter set with the RRC to a certain extent and dynamically notifying a mobile station apparatus of any one, it becomes possible to configure an appropriate reference signal in cooperation communication and a throughput gain is enhanced by cooperation communication. Although it is dynamically notified as a control channel in the physical layer here, one RRC may also be selected as is to be notified to a mobile station.

As indicated in Table 1, by including a parameter to be same as a legacy mobile station apparatus in any one of parameter set, it becomes possible to orthogonalize a reference signal with a legacy mobile station apparatus by the OCC. It is also included in the present invention to contain at least a parameter configuring an identical reference signal sequence in an area for cooperation communication in a parameter set. Further, when only intended to orthogonalization, it is possible to achieve making $c_{init}^{CSH}$ only identical among legacy mobile station apparatuses, or areas to carry out cooperation communication, or cooperating base stations, so that such case is also included in the present invention. Although the example of four types of parameter set is indicated here, it is also included in the present invention that, when there are two types of parameter set to configure one to be same as a legacy mobile station apparatus, a reference signal of Rel-10 or earlier and a reference signal unique to a mobile station apparatus is switched with one bit. Naturally, $\Delta_{SS}^{BSI}$ does not have to be unique to a mobile station apparatus, and Formula (5) with $\Delta_{SS}^{BSI}=0$ may also be used. In this case, an arbitrary reference signal sequence may be achieved only with $N_{ID}^{BS}$. This is indicated in Table 3. Here, a case of generating a reference signal of a sequence number same as a legacy mobile station apparatus is indicated.

TABLE 3

| Index | $N_{ID}^{BSI}$ | $c_{init}^{CSH}$ |
| --- | --- | --- |
| 0 | $N_1$ | $c_1$ |
| 1 | $N_2$ | $c_2$ |
| 2 | $N_3$ | $c_3$ |
| 3 | $N_{r10}$ | $c_{r10}$ |

Second Embodiment

A second embodiment indicates an example of using a virtual cell ID only. The difference from the first embodiment is in a point of determining cyclic shift hopping. Specifically, although an initial value of $c_{init}^{CSH}$ unique to a mobile station apparatus when determining a phase rotation amount of cyclic shift hopping in Formula (7), here it is determined from a virtual cell ID as Formula (8).

[Math 8]

$$c_{init} = \left\lfloor \frac{N_{ID}^{BSI}}{30} \right\rfloor \cdot 2^5 + f_{ss}^{PUSCH} \quad (8)$$

TABLE 4

| Index | $N_{ID}^{BSI}$ | $\Delta_{SS}^{BSI}$ |
| --- | --- | --- |
| 0 | $N_1$ | $\Delta_1$ |
| 1 | $N_2$ | $\Delta_2$ |
| 2 | $N_3$ | $\Delta_3$ |
| 3 | $N_{r10}$ | $\Delta_{r10}$ |

Accordingly, two parameters of $\{N_{ID}^{BSI}, \Delta_{SS}^{BSI}\}$ are configured with the RRC and one from them may be notified to a mobile station apparatus. Table 4 indicates a specific example. Here, in order to configure cyclic shift hopping identical to a mobile station apparatus of Rel-10 or earlier, Formula (8) has to be identical, so that a virtual cell ID identical to a mobile station apparatus Rel-10 or earlier is applied. That is $N_{r10}$ and $\Delta_{r10}$ in Table 4. By configuring in such a manner, even when there is a mobile station apparatus Rel-10 or earlier, it becomes possible to orthogonalize a reference signal for cooperation communication. Similar to the first embodiment, a parameter set is defined to allow configuration of an identical parameter among areas for cooperation communication or macro base stations for cooperation communication and LPN and one from them is dynamically notified to a mobile station apparatus. By configuring a parameter set to a certain extent with the RRC and dynamically notifying a mobile station apparatus of any one, it becomes possible to configure an appropriate reference signal in cooperation communication and a throughput gain by cooperation communication is enhanced.

A program to achieve all or part of the functions of the respective mobile station apparatuses and the control station apparatuses in the respective embodiments above described may also be recorded in a computer-readable recording medium and the program that is recorded in the recording medium is read and executed by a computer system, thereby achieving a mobile station apparatus and a station apparatus. The "computer system" in this context includes OS and hardware, such as a peripheral device.

The "computer-readable recording medium" refers to a portable medium, such as a flexible disk, a magnetooptical disk, a ROM, and a CD-ROM, and a storage apparatus, such as a hard disk built in a computer system. Further, the "computer-readable recording medium" also includes those dynamically holding a program for a short period of time, such as a communication line in a case of sending a program via a communication line such as a network like the internet and a telephone line, and those holding a program for a certain period of time, such as a volatile memory in a computer system to be a server and a client in that case. The above program may also be to achieve a part of the functions described before and further may also be one that is capable of achieving the functions described above in combination with a program already recorded in a computer system.

In addition, all or part of the respective mobile station apparatus A and base station apparatus B in the respective embodiments described above may also be achieved as an LSI, which is typically an integrated circuit. The respective functional blocks of the mobile station apparatus A and the base station apparatus B may also be made into a chip individually and all or part may also be integrated and made into a chip. A part may also be made into a chip and another part may also be achieved as software.

The approach to make an integrated circuit is not limited to an LSI but may also be achieved by a dedicated circuit or a general processor. When a technique to make an integrated circuit to substitute the LSI appears due to an advance in the semiconductor technique, it is also possible to use an integrated circuit by the technique.

Although detailed descriptions have been given to the embodiments of the present invention with reference to the drawings, specific configuration is not limited to the embodiments and design modification and the like without departing from the spirit of the present invention is also included.

INDUSTRIAL APPLICABILITY

Although being preferred to be used for a mobile communication system in which a mobile telephone apparatus is used as a mobile station apparatus, the present invention is not limited to this.

REFERENCE SIGNS LIST

A mobile station apparatus
1 coding unit
2 modulation unit
3 DFT unit
4 reference signal multiplexing unit
5 frequency allocation unit
6 IFFT unit
7 CP insertion unit
8 wireless unit
9 antenna
10 antenna
11 wireless unit
12 control information detection unit
13 allocation information detection unit
14 reference signal sequence information detection unit
15 MCS information detection unit
16 reference signal generation unit
B base station apparatus
31 parameter set configuration unit
32 parameter set selection unit
33 control signal generation unit
34 wireless unit
35 antenna

The invention claimed is:

1. A control station apparatus notifying a first mobile station apparatus of a parameter group generating a reference signal, the control station apparatus comprising:
   an RRC layer to configure a parameter set including a plurality of parameter groups generating the reference signal; and
   a physical layer to select one of the parameter groups and notify the first mobile station apparatus.

2. The control station apparatus according to claim 1, wherein
   the parameter set is configured with a plurality of parameter groups that respectively configure a sequence number and a cyclic shift hopping pattern of the reference signal and includes a parameter group generating a reference signal the same as in a second mobile station apparatus different from the first mobile station apparatus.

3. The control station apparatus according to claim 2, wherein
   the parameter set includes an initial value to configure a cyclic shift hopping pattern the same as in the second mobile station apparatus and, in a case that communication occurs at the same time of a legacy mobile station apparatus, notifies the first mobile station apparatus of that.

4. The control station apparatus according to claim 1, wherein
   the parameter set includes a parameter generating identical reference signal and cyclic shift hopping pattern in a plurality of cooperating sending and receiving points.

5. The control station apparatus according to claim 1, wherein
   the parameter set is configured only with a parameter group that determines a plurality of a sequence number and a cyclic shift hopping pattern is determined with a virtual cell ID to determine a sequence number of the reference signal.

6. The control station apparatus according to claim 5, wherein
   the parameter set includes parameter groups to configure a sequence number of a reference signal the same as in the second mobile station apparatus.

7. A control method in a control station apparatus that notifies a first mobile station apparatus of a parameter group generating a reference signal, comprising the steps of:
   configuring a parameter set including a plurality of parameter groups generating the reference signal in an RRC layer; and
   selecting one of the parameter groups in a physical layer to notify a mobile station apparatus.

8. A non-transitory computer-readable medium storing a program causing a computer to execute the control method according to claim 7.

* * * * *